(12) United States Patent
Dewa

(10) Patent No.: US 8,875,182 B2
(45) Date of Patent: Oct. 28, 2014

(54) DATA BROADCAST PROCESSING DEVICE, METHOD AND PROGRAM HAVING FEATURES THAT PREVENT SIMULTANEOUS EXECUTION OF IMCOMPATIBLE PROCESSES

(75) Inventor: Yoshiharu Dewa, Toyko (JP)

(73) Assignee: Sony Corporation (JP)

( * ) Notice: Subject to any disclaimer, the term of this patent is extended or adjusted under 35 U.S.C. 154(b) by 1328 days.

(21) Appl. No.: 12/311,619

(22) PCT Filed: Oct. 5, 2007

(86) PCT No.: PCT/JP2007/069547
§ 371 (c)(1),
(2), (4) Date: Apr. 3, 2009

(87) PCT Pub. No.: WO2008/044625
PCT Pub. Date: Apr. 17, 2008

(65) Prior Publication Data
US 2010/0211763 A1    Aug. 19, 2010

(51) Int. Cl.
*G06F 13/00*     (2006.01)
*H04N 21/435*    (2011.01)
*H04N 21/443*    (2011.01)
*H04N 21/235*    (2011.01)
*H04N 21/81*     (2011.01)
*G06F 21/51*     (2013.01)
*G06F 9/52*      (2006.01)

(52) U.S. Cl.
CPC ......... *H04N 21/8173* (2013.01); *H04N 21/435* (2013.01); *H04N 21/443* (2013.01); *H04N 21/235* (2013.01); *G06F 21/51* (2013.01); *G06F 9/52* (2013.01)
USPC ................... 725/40; 725/25; 725/44; 725/51; 725/131; 725/139; 725/151; 718/106; 718/107

(58) Field of Classification Search
USPC .......... 718/106, 107; 725/25, 51, 44, 40, 131, 725/139, 151
See application file for complete search history.

(56) References Cited

U.S. PATENT DOCUMENTS

2003/0208778 A1* 11/2003 Aratani et al. ................. 725/139
2005/0289591 A1* 12/2005 Vermola et al. ................. 725/45

FOREIGN PATENT DOCUMENTS

| JP | 11338733 A | 12/1999 |
| JP | 2003143522 A | 5/2003 |
| JP | 2003-274306 A | 9/2003 |
| JP | 2005-159852 A | 6/2005 |
| JP | 2005-303717 A | 10/2005 |
| JP | 2006238136 A | 9/2006 |

OTHER PUBLICATIONS

NCL 2.0: Integrating New Concepts to XML Modular Language, Publication date Oct. 28, 2004.*
Office Action from Japanese Application No. 2006-275235, dated Jan. 31, 2012.
Kameyama et al, "Digital Broadcast Text Book", Impress R & D, Oct. 11, 2004, pp. 246-286, partial translation pp. 259-273.

* cited by examiner

*Primary Examiner* — Jun Fei Zhong
(74) *Attorney, Agent, or Firm* — Lerner, David, Littenberg, Krumholz & Mentlik, LLP

(57) ABSTRACT

The present invention relates to a data broadcast processing device, method, and program which enable secure control of an operation of a data broadcast processing device. Since a flag standalone is not set in a script NCL Script 133, the script NCL Script 133 is executed from time t13 till time t15, simultaneously with a script NCL Script 132 and a script NCL Script 134. In contrast, a script NCL Script 135, in which the flag standalone is set, is prohibited from being executed simultaneously with another script NCL Script 134 in which the flag standalone is set.

13 Claims, 8 Drawing Sheets

DATA BROADCAST PROCESSING DEVICE, METHOD AND PROGRAM HAVING FEATURES THAT PREVENT SIMULTANEOUS EXECUTION OF IMCOMPATIBLE PROCESSES

CROSS-REFERENCES TO RELATED APPLICATIONS

The present application is a national phase entry under 35 U.S.C. §371 of International Application No. PCT/JP2007/069547 filed Oct. 5, 2007, published on Apr. 17, 2008 as WO 2008/044625 A1, which claims priority from Japanese Patent Application No. JP 2006-275235 filed in the Japanese Patent Office on Oct. 6, 2006.

TECHNICAL FIELD

The present invention relates to a data broadcast processing device, method, and program. In particular, the present invention relates to a data broadcast processing device, method, and program which achieve secure control of the data broadcast processing device.

BACKGROUND ART

In data broadcasting that is currently carried out in Japan, a BML (Broadcast Markup Language), which is described in Non-Patent Document 1, for example, is used. The BML does not only allow designation of frames for text, a still image to be included, a video image, an audio, and so on, but also allows inclusion of an ECMA (European Computer Manufacture Association) Script. This enables operation of a data broadcast reception device.

Non-Patent Document 1: Wataru Kameyama and Tsuyoshi Hanamura, "Kaiteiban Dejitaru Housou Kyoukasho Jou (Revised Digital Broadcasting Textbook Vol. 1)," Inpuresu R&D (Impress R&D), Oct. 11, 2004, p. 246 to 286.

DISCLOSURE OF INVENTION

Technical Problem

Meanwhile, in Brazil, there is a plan for implementation of data broadcasting using an NCL (Nested Content Language). In the NCL, a Lua script can be used as a script language. The Lua script, however, does not have a function of prohibiting overlapping execution of a plurality of processes that should be prohibited from being executed simultaneously. This leads to the possibility that a plurality of processes that should not be performed in an overlapping manner might be executed simultaneously, making it difficult to securely control an operation of the data broadcast reception device.

The present invention has been devised in view of the above situation, and makes it possible to control the operation of the data broadcast processing device more securely.

Technical Solution

One aspect of the present invention is a data broadcast processing device that receives and processes a data broadcast, the data broadcast processing device including: determination means for determining whether or not each of processing units that are to be processed sequentially along a time axis is prohibited from being executed simultaneously with another processing unit; execution means for executing the processing unit if the processing unit is not prohibited from being executed simultaneously with the other processing unit; and prohibition means for prohibiting execution of the processing unit if the processing unit is prohibited from being executed simultaneously with the other processing unit.

The determination means may determine whether or not the processing unit is prohibited from being executed simultaneously with the other processing unit, based on a flag of the processing unit.

The data broadcast processing device may further include selection means for selecting the processing unit, wherein the determination means determines whether or not the processing unit selected by the selection means is prohibited from being executed simultaneously with the other processing unit, based on a flag of the processing unit.

The data broadcast processing device may further include selection means for, when there are a plurality of processing units that are prohibited from being executed simultaneously with the other processing unit, selecting one of the processing units as a processing unit to be executed.

The processing unit may be one of a video image, a still image, an audio, text, and a processing unit for controlling a function of the data broadcast processing device.

In the case where the processing unit is the processing unit for controlling the function of the data broadcast processing device, the prohibition means may prohibit execution of the processing unit selected until completion of processing of a processing unit that is already being executed.

The processing unit may be a processing unit described in an NCL.

The processing unit may be a procedural object described by an NCL script that has been transmitted from a broadcasting device in accordance with the ISDB-T standard.

Another aspect of the present invention is a data broadcast processing method for receiving and processing a data broadcast, the data broadcast processing method including: a determination step of determining whether or not each of processing units that are to be processed sequentially along a time axis is prohibited from being executed simultaneously with another processing unit; an execution step of executing the processing unit if the processing unit is not prohibited from being executed simultaneously with the other processing unit; and a prohibition step of prohibiting execution of the processing unit if the processing unit is prohibited from being executed simultaneously with the other processing unit.

Yet another aspect of the present invention is a program for receiving and processing a data broadcast, the program causing a computer to execute a process including: a determination step of determining whether or not each of processing units that are to be processed sequentially along a time axis is prohibited from being executed simultaneously with another processing unit; an execution step of executing the processing unit if the processing unit is not prohibited from being executed simultaneously with the other processing unit; and a prohibition step of prohibiting execution of the processing unit if the processing unit is prohibited from being executed simultaneously with the other processing unit.

Another aspect of the present invention is a data broadcast processing device that receives and processes a data broadcast that has been transmitted from a broadcasting device in accordance with the ISDB-T standard, the data broadcast processing device including: determination means for determining whether or not a procedural object that has been sent via the data broadcast and is composed of a program that is described by an NCL script is prohibited from being executed simultaneously with another procedural object; execution means for executing the procedural object if the procedural object is not prohibited from being executed simultaneously with the other procedural object; and prohibition means for prohibiting execution of the procedural object if the procedural object is prohibited from being executed simultaneously with the other procedural object.

The data broadcast processing device may further include selection means for, when there are a plurality of procedural objects that are prohibited from being executed simultaneously with the other procedural object, selecting one of the procedural objects as a procedural object to be executed.

Yet another aspect of the present invention is a data broadcast processing method for receiving and processing a data broadcast that has been transmitted from a broadcasting device in accordance with the ISDB-T standard, the data broadcast processing method including: a determination step of determining whether or not a procedural object that has been sent via the data broadcast and is composed of a program that is described by an NCL script is prohibited from being executed simultaneously with another procedural object; an execution step of executing the procedural object if the procedural object is not prohibited from being executed simultaneously with the other procedural object; and a prohibition step of prohibiting execution of the procedural object if the procedural object is prohibited from being executed simultaneously with the other procedural object.

Yet another aspect of the present invention is a program for receiving and processing a data broadcast that has been transmitted from a broadcasting device in accordance with the ISDB-T standard, the program causing a computer to execute a process including: a determination step of determining whether or not a procedural object that has been sent via the data broadcast and is composed of a program that is described by an NCL script is prohibited from being executed simultaneously with another procedural object; an execution step of executing the procedural object if the procedural object is not prohibited from being executed simultaneously with the other procedural object; and a prohibition step of prohibiting execution of the procedural object if the procedural object is prohibited from being executed simultaneously with the other procedural object.

According to one aspect of the present invention, it is determined whether or not each of processing units that are to be processed sequentially along a time axis is prohibited from being executed simultaneously with another processing unit. The processing unit is executed if the processing unit is not prohibited from being executed simultaneously with the other processing unit, whereas execution of the processing unit is prohibited if the processing unit is prohibited from being executed simultaneously with the other processing unit.

According to another aspect of the present invention, it is determined whether or not a procedural object that has been sent via a data broadcast and is composed of a program that is described by an NCL script is prohibited from being executed simultaneously with another procedural object. The procedural object is executed if the procedural object is not prohibited from being executed simultaneously with the other procedural object, whereas execution of the procedural object is prohibited if the procedural object is prohibited from being executed simultaneously with the other procedural object.

Advantageous Effects

As described above, according to an aspect of the present invention, it is possible to control an operation of a data broadcast processing device more securely.

EXPLANATION OF REFERENCE SYMBOLS

1: Television receiver, 2: Remote controller, 11: Reception section, 12: Output section, 13: Communication section, 14: Control section, 51: ISDB-T transmission layer, 52: DSM-CC carousel, 53-1, 53-2: NCL App, 61: NCL browser, 62: Resident program, 81: Determination section, 81: Selection section, 83: Deletion section, 84: Execution section, 85: Control section

BEST MODE FOR CARRYING OUT THE INVENTION

Hereinafter, embodiments of the present invention will be described with reference to the accompanying drawings.

Figure 1:
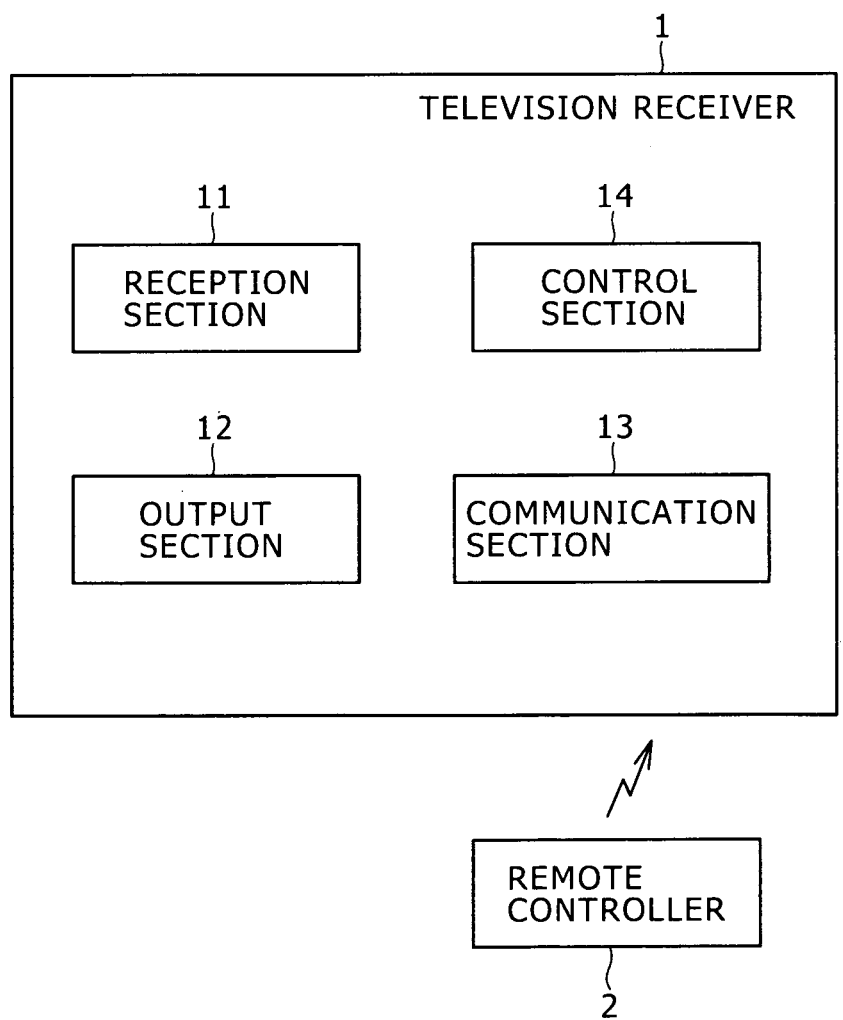
FIG. 1 is a block diagram illustrating the structure of a television receiver according to an embodiment of the present invention.

FIG. 1 is a block diagram illustrating the structure of a television receiver 1 as a data broadcast processing device according to an embodiment of the present invention. The television receiver 1 is a data broadcast processing device that receives a data broadcast that is transmitted from a broadcasting device in accordance with the ISDB-T (Integrated Services Digital Broadcasting for Terrestrial) standard, and processes the received data broadcast, and is remotely controlled by a remote controller 2.

The television receiver 1 has a reception section 11, an output section 12, a communication section 13, and a control section 14. The reception section 11 receives a broadcast radio wave and demodulates it. The output section 12 is composed of an LCD (Liquid Crystal Display), a CRT (Cathode Ray Tube), a loudspeaker, or the like, and displays an image based on a signal obtained as a result of the demodulation by the reception section 11 and also outputs an audio. The communication section 13 receives an infrared signal from the remote controller 2, and outputs a signal corresponding to the received signal to the control section 14. The control section 14 is composed of a microcomputer or the like, for example, and controls an operation of each part of the television receiver 1.

Figure 2:
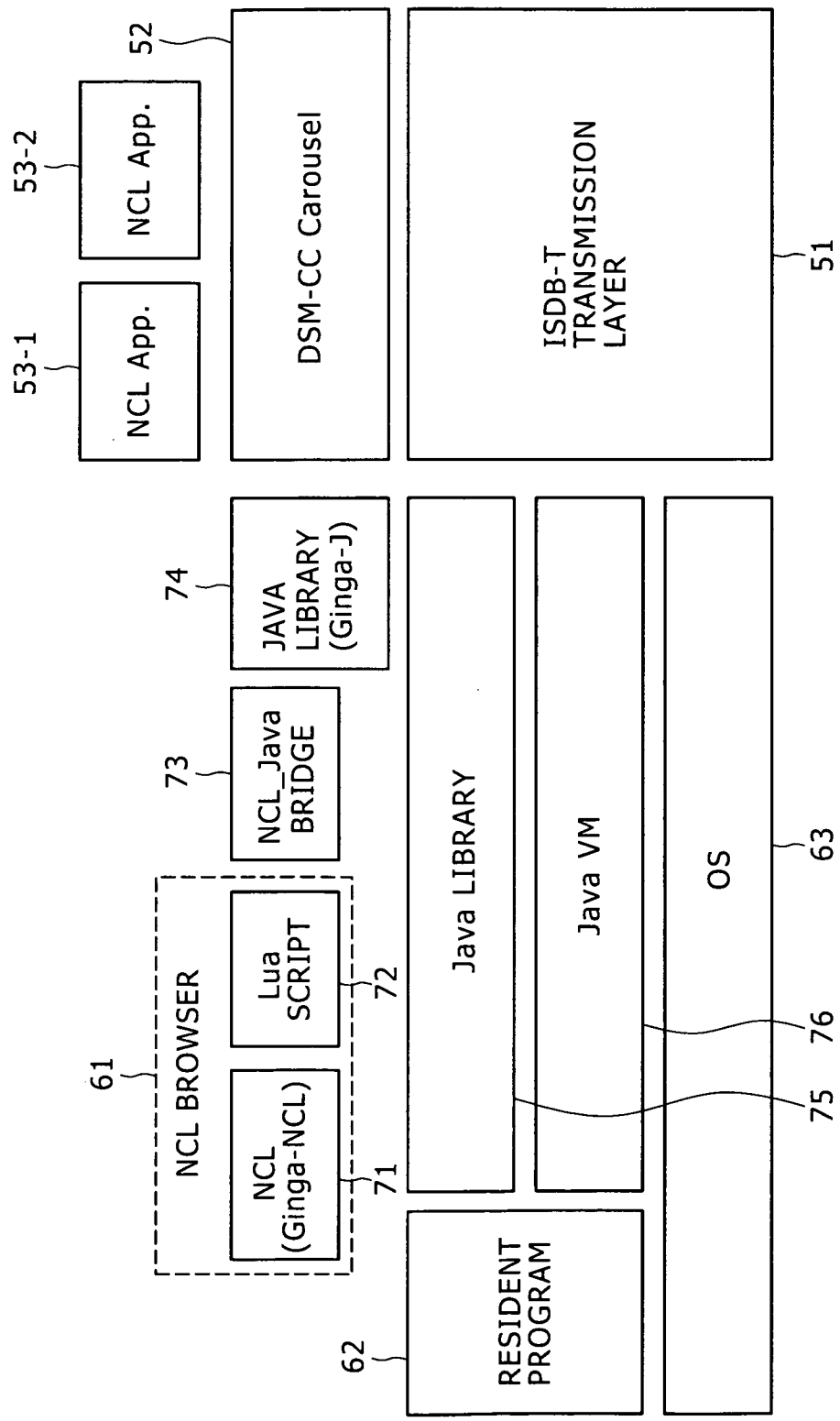
FIG. 2 is a diagram for explaining a mechanism for transferring contents.

FIG. 2 is a diagram illustrating a mechanism for transferring data from the broadcasting device (not shown) to the television receiver 1. A DSM-CC (Digital Storage Media-Command and Control) carousel 52 operates on an ISDB-T transmission layer 51, and transmits a plurality of contents, NCL Apps 53-1 and 53-2, repeatedly. The NCL Apps 53-1 and 53-2 are segmented into a plurality of modules, and each of the modules stores a processing unit, such as a monomedium like a video image, a still image, an audio, or text, MPEG (Moving Picture Experts Group), JPEG (Joint Photographic Experts Group), WAV (Waveform audio format), HTML (Hyper Text Markup Language), a script NCL Script, or the like.

The television receiver 1 has: an OS (Operating System) 63; a Java(R) VM (Virtual Machine) 76, which operates thereon; and a Java(R) library 75, which operates thereon. The Java(R) library 75 has a Java(R) library 74 as Ginga-J, which reads the contents NCL Apps 53-1 and 53-2 and executes them. The Java(R) library 74 is coupled to an NCL browser 61 via an NCL-Java(R) bridge 73. A Lua script 72 in the NCL browser 61 is incapable of control of an operation based on a user operation, such as channel selection or programming on the television receiver 1, but, when the Lua script 72 is coupled to the Java(R) library 75 via the NCL-Java(R) bridge 73, is made capable of controlling it via a Java(R) script.

The NCL browser 61 has an NCL 71 as Ginga-NCL, and the Lua script 72. As with the Java(R) library 74, the NCL browser 61 reads the contents NCL Apps 53-1 and 53-2 and executes them. A resident program 62 is an EPG (Electronic Program Guide) or other programs which are started upon activation of the OS 63 (Operating System) and stay running all the time.

The Lua script 72 is a procedural language that has been designed and developed by TecGraf, the Computer Graphics Technology Group at the Department of Information Engineering in the Catholic University of Rio de Janeiro, with the view of incorporating it into a host program in the C language. The Lua script 72 is characterized by a high-speed operation, great portability, ease in incorporation, and so on, and has been used in many game industries and so on in recent years.

Lua is disclosed at URL:
http://www.lua.org/map.html.

In the NCL, the Lua script and a Java(R) program (in xlet format) can be embedded in its own data, and it is possible to allow these programs to run so as to be synchronized with other objects displayed. These embedded codes are handled as NCL objects, and have states such as start, stop, pause, and resume.

The Lua script 72 and the Java(R) library 74 are capable of operating each other, by defining a <link> element, which represents a reference to a <media> element in which Xlet supporting Ginga-J on the NCL is embedded, or using a function of Ginga-J capable of monitoring an arbitrary NCL event on Ginga-J, for example. This is the NCL-Java(R) bridge 73.

A procedural object is inserted in an NCL document, and seeks to add a new calculation feature primarily to a declarative document. A method of adding the procedural object into the NCL document is to define the <media> element. A content of this element (as located through an src attribute) is a procedural code to be executed. Both EDTV and BDTV profiles of NCL 3.0 version allow two media types to be associated with the <media> element. One is application/x-ginga-NCLua for Lua procedural codes (an extension thereof is .lua), and the other is application/x-ginga-NCLet for Java (R) (i.e., XLET) procedural codes (an extension thereof is .xlet, .xlt, or .class). That is, the Lua script 72 and Java(R) scripts forming the Java(R) library 74 are all procedural objects.

Content producers are able to define NCL links to start, stop, pause, or resume the execution of the procedural code. This technique is the same as that which is applied for common objects that can be displayed. A procedural player (i.e., an execution engine for the language) must be connected to a procedural type execution environment using an NCL formatter.

As with common media contents, the procedural player must control event state machines associated with an NCL procedural node (NCLua or NCLet). For example, if the execution of a code is completed, the player must generate a stop transition in a main event presentation state machine corresponding to the execution of a procedure.

The NCL allows the procedural code to be synchronized with other NCL objects (either procedural or not). A <media> element containing the procedural code may also define anchors (through <area> elements). Also, it may define properties (through <property> elements).

The <area> elements must define only an id attribute. The procedural code may register a listener for these <area> elements. If external links start, stop, pause, or resume anchor presentation, callbacks in the procedural code must be triggered. Definition of a method for these callbacks is a responsibility of each procedural code associated with the NCL procedural object.

On the other hand, the procedural code may also start, stop, pause, or resume these anchors based on a request from an API (Application Programming Interface) offered by the procedural language. These transitions can be used as conditions of NCL links to trigger actions on other NCL objects in the same document. Thus, a two-way synchronization can be established between the procedural code and the remainder of the NCL document.

Another method of causing the procedural code to be synchronized with other NCL objects achieves the synchronization through <property> elements in the NCL. The <property> element is defined as a child of a <media> element representing a procedural code that can be mapped to a code function (or method) or to a code attribute. When it is mapped to a function code, a link having an action "set" applied to its property must be executed so as to involve a value for setting as interpreted as a parameter to be passed to the function. A name attribute of the <property> element is used to identify a procedural code function. When the procedural code is mapped to the <property> element, the action "set" must be set as a value for the attribute.

A <property> element is defined as a child of a <media> element representing the procedural code so as to involve a role as an NCL link. In this case, the NCL formatter must query a property value in order to evaluate a link expression. If the <property> element is mapped to a code attribute, a code attribute value must be returned by a procedural data execution player to the NCL formatter. If the <property> element is mapped to a code function, the function must be called and its output value must be returned by the procedural data execution player to the NCL formatter.

Procedural languages should offer an API that allows procedural codes to query any pre-defined or dynamic properties' values of an NCL settings node. The NCL settings node is a <media> element of an "application/x-ginga-setting" type.

Bridging between Ginga-NCL and Ginga-J is accomplished by two methods below.

(1) In one direction, the NCL achieves the bridging by defining a <link> element representing a reference to a <media> element in which Xlet (an application/x-ginga-NCLet type) supporting Ginga-J is embedded. In addition, similarly, this can be achieved also by a Lua script referring to a Ginga-J method. In this case, the Lua script is a <media> element of an application/x-ginga-NCLua type.

(2) In the opposite direction, it is accomplished by using a function of Ginga-J that is capable of monitoring an arbitrary NCL event. Alternatively, it may be accomplished by using a function of Ginga-J that performs a process of changing an NCL element and property through definition relationships of the <link> elements or an NCL edit command.

As noted previously, the Ginga-NCL is capable of operating Ginga-J through the <media> element of the application/x-ginga-NCLet type or the <link> element.

As with traditional media contents, the NCL is capable of causing an Xlet code to be synchronized with other NCL objects (regardless of whether they are an procedural object or not). Producers of NCL contents are able to describe execution of an Xlet procedural code, such as for start, stop, pause, or resume, as an NCL link. The code is expressed as a <media> element of the application/x-ginga-NClet type. An NCLet player (having a Java(R) engine as a basis) must have an interface with a procedural execution environment involving the NCL formatter.

A <media> element including a Java(R) code may define the anchor through the <area> element, or may define the attribute through the <property> element. The player must control a state machine for an event related to these interface elements.

The <area> element of an NCLet object must have the id attribute defined, at least. The Xlet code may register a listener for the <area> element. When an anchor expression with an external link is started, stopped, paused, or resumed, a callback in the Xlet code must be triggered. Meanwhile, the Xlet code may give a command to start, stop, pause, or resume such an anchor through the API offered by the procedural language. A transition that occurs because of such a command can be used as a condition of the NCL link for a trigger action on another NCL object in the same document. Thus, a two-way synchronization can be established between the Xlet code and other objects in the NCL document.

The <property> element is defined as a child of a <media> element of the application/x-ginga-NCLet type which is mapped to an Xlet code method or an Xlet code attribute. When it is mapped to a function code, a link having the action "set" applied to its property must be executed so as to involve a value for setting as interpreted as a parameter to be passed to the function. The name attribute of the <property> element is used to identify the procedural code function. When the Xlet code is mapped to the <property> element, the action "set" must be set as a value for the attribute. The <property> element may be associated with a role as the NCL link. In this case, the NCL formatter must query a property value in order to evaluate a link expression.

If the <property> element is mapped to a code attribute, a code attribute value must be returned by the procedural data execution player to the NCL formatter. If the <property> element is mapped to the code function, the function must be called and its output value must be returned by the procedural data execution player to the NCL formatter.

There is a likelihood that, depending on how middleware is made, Lua is provided with an equivalent of an API offered by Ginga-J, in order to access a resource in a set-top box or a function of Ginga.

In addition to the bridging through a Ginga-J method that is related to an interface (the <area> element and <property> element) of a <media> element representing the Xlet procedural code, any Ginga-J application is capable of registering itself as a listener of any state transition that may arise from an event state machine that is related to the NCL document. Thus, any NCL state transition can be used as a trigger for a Ginga-J application function.

Ginga-J offers an API that allows Xlet codes to query any pre-defined or dynamic properties' values of an NCL settings node. The NCL settings node is a <media> element of the "application/x-ginga-setting" type.

Moreover, Ginga-J offers, as an NCL API group, a group of methods for supporting an NCL edit command and private base manager command.

Figure 3:
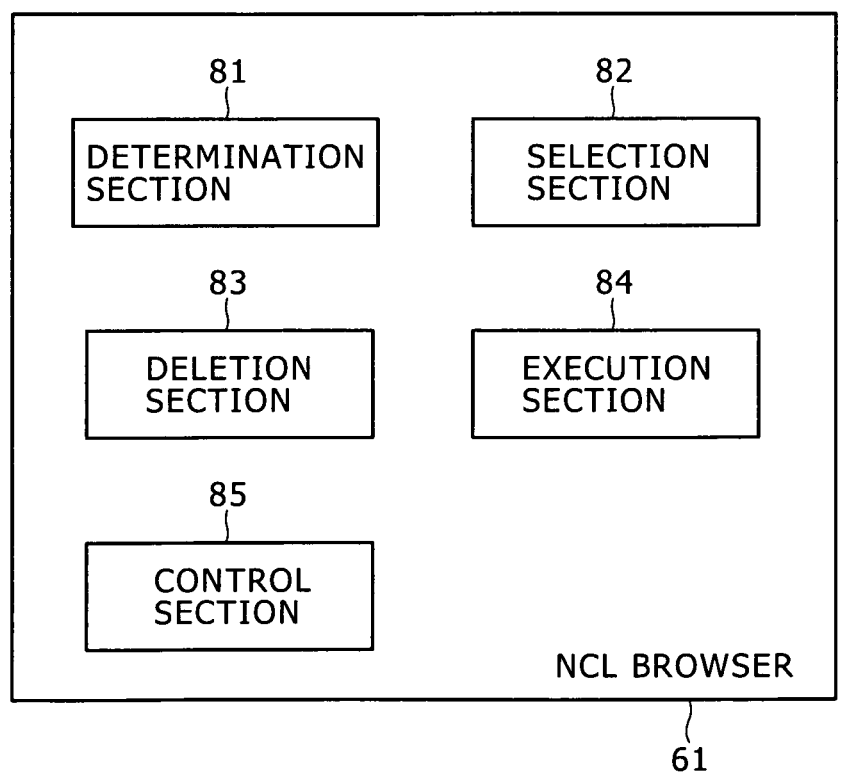
FIG. 3 is a block diagram illustrating a functional structure of an NCL browser.

FIG. 3 illustrates a functional structure of the NCL browser 61. As illustrated in this figure, the NCL browser 61 has a determination section 81, a selection section 82, a deletion section 83, an execution section 84, and a control section 85. The determination section 81 performs various types of determination processes. The selection section 82 selects a monomedium, a script, or the like. The deletion section 83 deletes a selected monomedium or script. The execution section 84 executes the monomedium or the script. The control section 85 performs control processes, such as a process of suspending processing of a processing unit.

Figure 4:
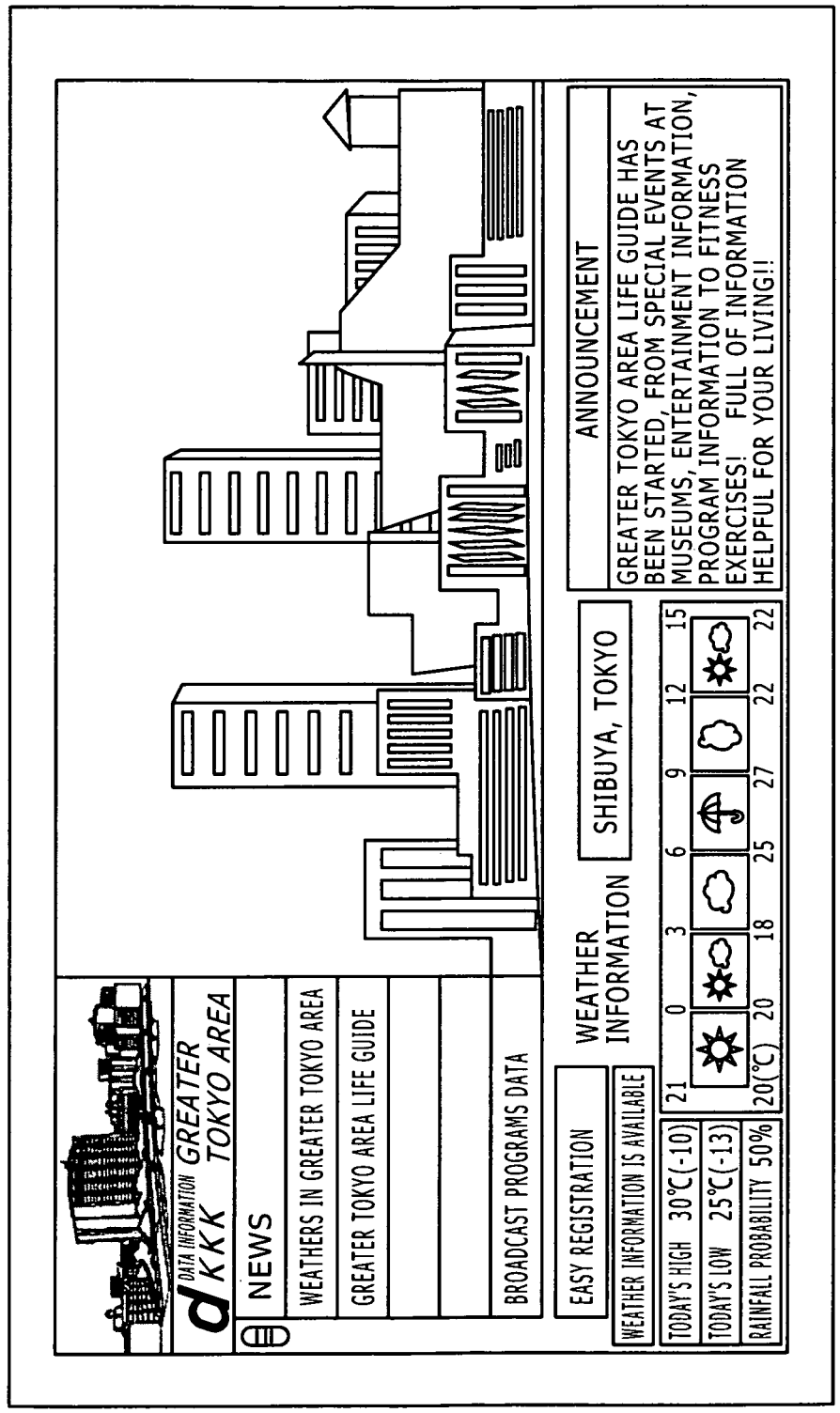
FIG. 4 is a diagram illustrating an exemplary screen of a data broadcast.

The NCL browser 61 reads and executes a monomedium and a script described in an NCL contained in a demodulated signal, so that an image of a data broadcast including text as illustrated in FIG. 4, a video image, a still image, an audio, and so on are outputted to the output section 12, for example.

Figure 5:
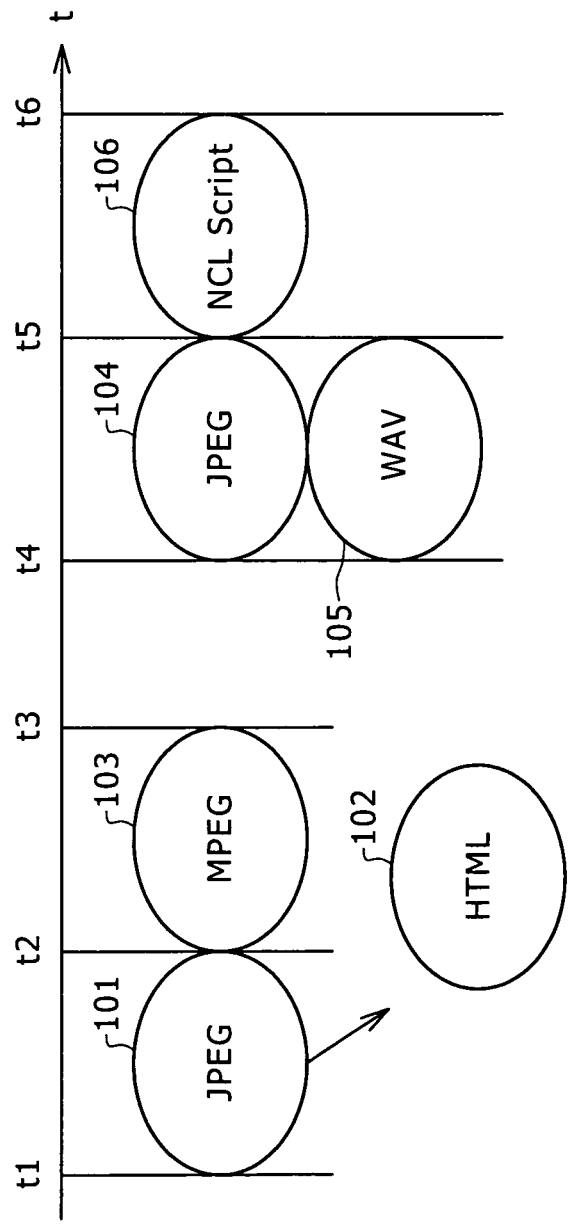
FIG. 5 is a diagram for explaining processing units.
Figure 6:
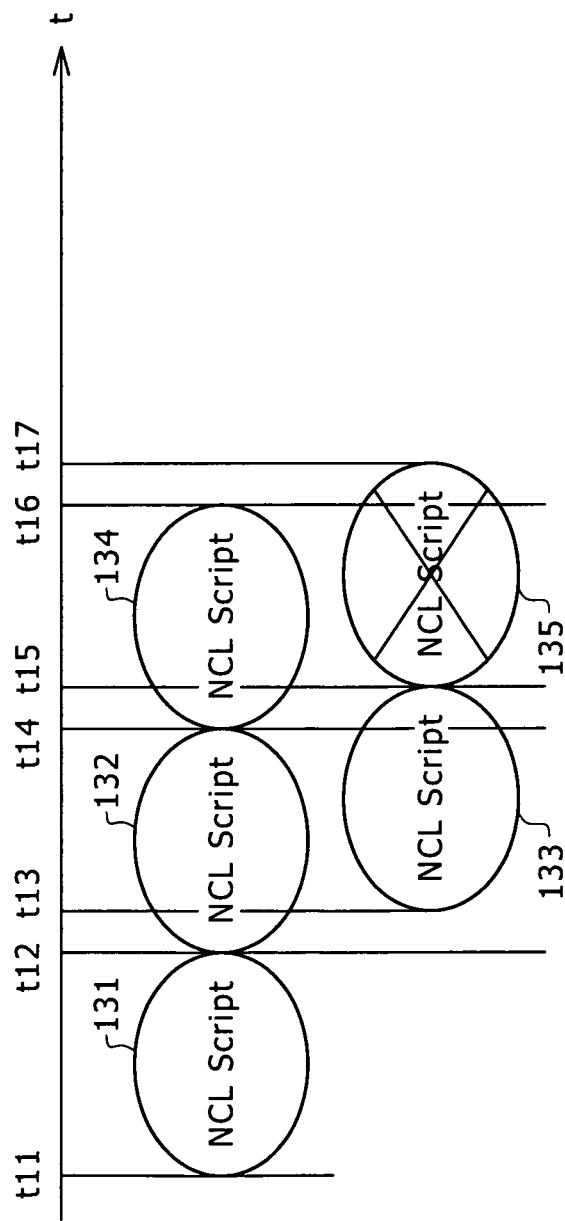
FIG. 6 is a diagram for explaining scripts NCL Scripts as processing units.

In this embodiment, as illustrated in FIGS. 5 and 6, processing units 101 to 106 and processing units 131 to 135 are described in the NCL in an order in which they are processed along a time axis, and are transferred from a broadcast station. In other words, they are procedural objects that have been transmitted from the broadcasting device in accordance with the ISDB-T standard. In the example of FIG. 5, the processing unit JPEG 101 is executed at time t1, so that a still image is displayed. If a certain button on the remote controller 2 is operated during the execution of the processing unit JPEG 101, the processing unit HTML 102 is executed, so that a menu screen or the like is displayed, for example.

When the processing of the processing unit JPEG 101 has been completed at time t2, the processing unit MPEG 103 is next executed until time t3, so that a video image is displayed. The processing unit JPEG 104 and the processing unit WAV 105 are executed simultaneously from time t4 till time t5, so that a still image and an audio are outputted.

In this embodiment, an NCL Script, which is a script, as well as monomedia JPEG, HTML, MPEG, and WAV, can be described as media in the NCL. In the example of FIG. 5, the processing unit NCL Script 106, which is a script, is executed from time t5 till time t6, so that a function or operation of the television receiver 1 is controlled. For example, in the television receiver 1, data is stored in an internal non-volatile memory, or EPG data is read.

Moreover, in this embodiment, a flag can be set so that a script as a medium can be prohibited from being executed simultaneously with another script. Thus, it is possible to define standalone as a descriptor parameter descriptorParam, which is a content of an element of a descriptor of Extended Descriptor Module. Simultaneous start of scripts in which this flag is set is prohibited.

In an embodiment of FIG. 6, for example, scripts NCL Scripts 131, 132, and 134 are executed sequentially from time t11, time t12, and time t14, respectively. These are procedural objects described by NCL scripts. A script NCL Script 133 is executed from time t13 till time t15, simultaneously with the script NCL Script 132 and the script NCL Script 134 (such that part of operation periods thereof overlap with each other). The flag standalone is not set in the script NCL Script 133, and therefore such simultaneous execution thereof with another script is possible. For example, in cases such as when an adding/subtracting process is performed with software, simultaneous execution of multiple processes is possible, because an operation of hardware is not necessary.

On the other hand, the flag standalone is set in each of the script NCL Script 135 and the script NCL Script 134. The script NCL Script in which the flag standalone is set is prohibited from being executed simultaneously with another script NCL Script in which the flag standalone is set. Accordingly, as illustrated in FIG. 6, in the case where the processing of the script NCL Script 135 has been programmed to start after completion of the processing of the script NCL Script 133, for example, the processing of the script NCL Script 133 may be completed later than expected for some reason. In this case, because the execution of another script NCL Script 134, in which the flag standalone is set, is in progress at the time when the processing of the script NCL Script 135 should be started, the processing of the script NCL Script 135 is prohibited. Thus, unfortunate simultaneous execution of conflicting processes, which would result in occurrence of an error, is prevented. For example, regarding a function for program selection, simultaneous execution of multiple processes is prohibited when the number of channels through which the reception section 11 can receive data is one.

Note that the flag standalone can be set not only in the scripts but also in the monomedia.

Figure 7:
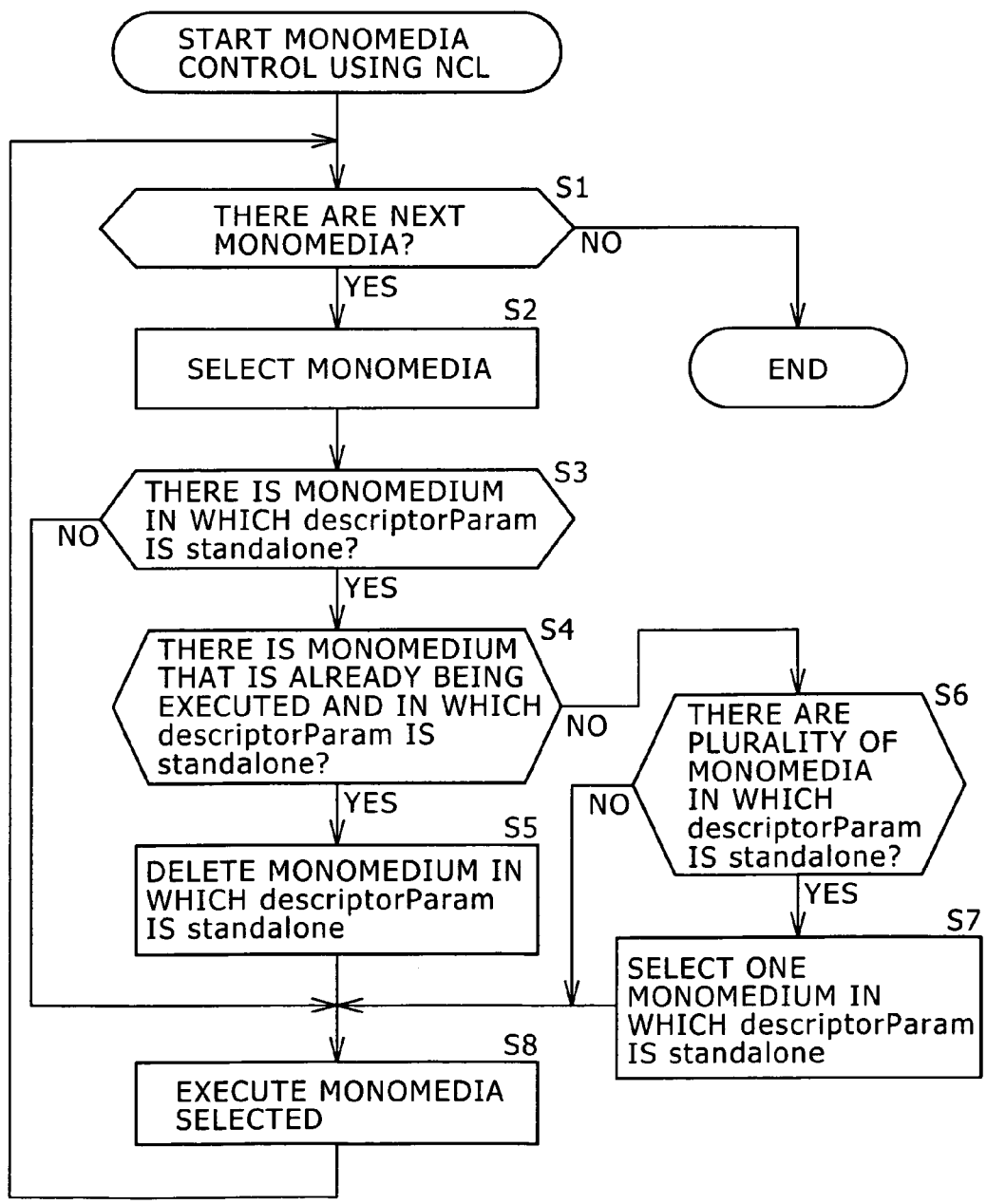
FIG. 7 is a flowchart for explaining a procedure for controlling monomedia.
Figure 8:
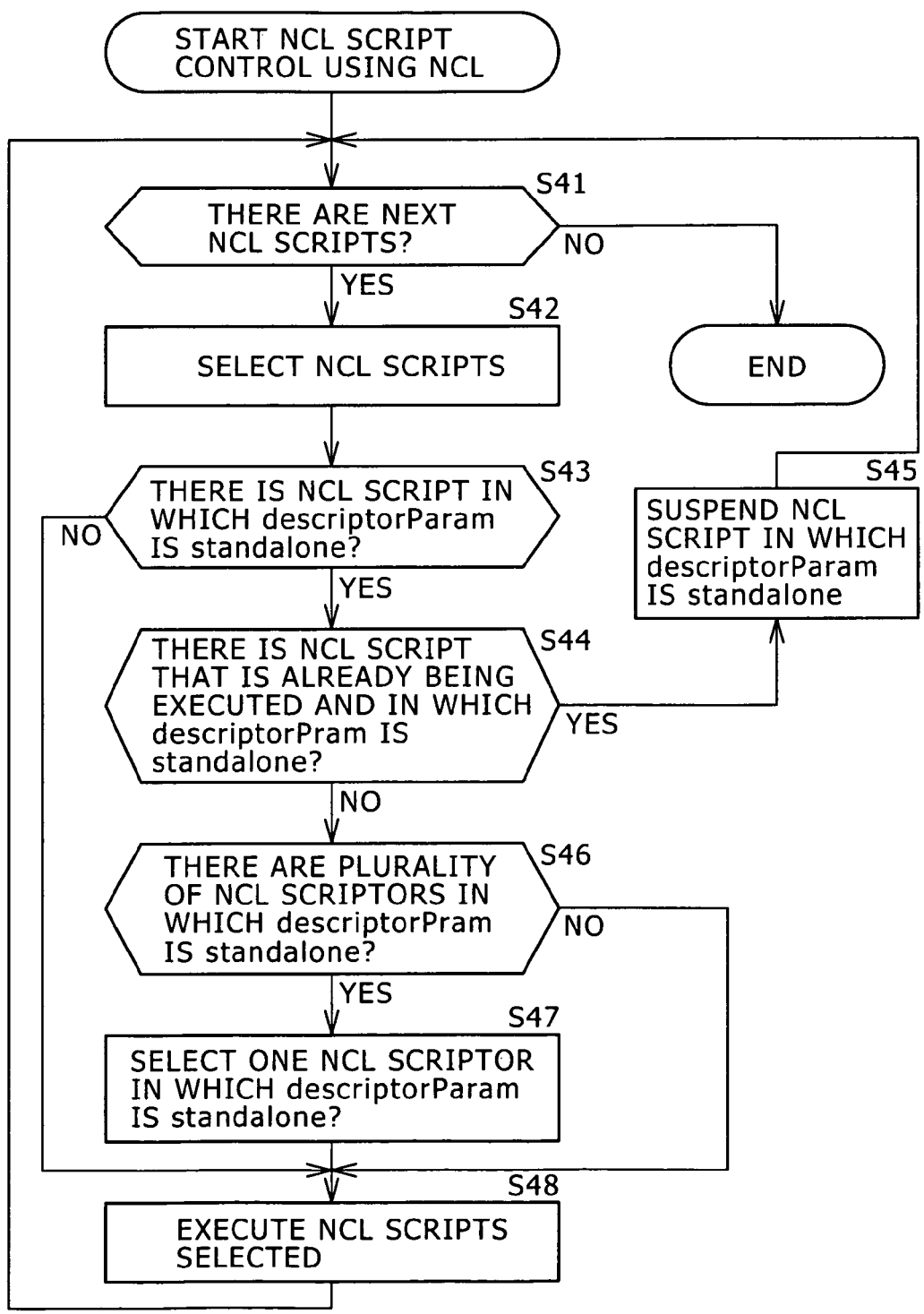
FIG. 8 is a flowchart for explaining a procedure for controlling scripts NCL Scripts.

Next, with reference to flowcharts of FIGS. 7 and 8, processes of controlling the monomedia and the scripts will now be described below. First, with reference to FIG. 7, a process of controlling the still image, video image, text, and audio monomedia JPEG, MPEG, HTML, and WAV will now be described below.

At step S1, the determination section 81 determines whether or not there are next monomedia among the monomedia that should be processed sequentially along the time axis. If there are the next monomedia, the selection section 82 selects the next monomedia at step S2.

At step S3, the determination section 81 determines whether or not the monomedia selected at step S2 include a monomedium in which the flag descriptorParam is standalone. If the monomedia selected include a monomedium in which the flag descriptorParam is standalone, the determination section 81 determines at step S4 whether or not there is any monomedium that is already being executed and in which the flag descriptorParam is standalone.

If there is a monomedium that is already being executed and in which the flag descriptorParam is standalone, the deletion section 83 deletes the monomedium in which the flag descriptorParam is standalone from a list of the selected monomedia, at step S5. Then, at step S8, the execution section 84 executes the monomedia selected at step S2. At this time, because the monomedium in which the flag descriptorParam is standalone was deleted at step S5, execution of that monomedium is prohibited in essence. This contributes to achieving secure control of the operation of the television receiver 1.

If it is determined at step S4 that there is no monomedium that is already being executed and in which the flag descriptorParam is standalone, the determination section 81 determines at step S6 whether or not the monomedia selected include a plurality of monomedia in which the flag descriptorParam is standalone. If they include a plurality of monomedia in which the flag descriptorParam is standalone, the selection section 82 selects one of the plurality of monomedia in which the flag descriptorParam is standalone, at step S7. This results in a prohibition of simultaneous execution of a plurality of monomedia in which the flag descriptorParam is standalone. Then, the monomedium selected is executed by the execution section 84 at step S8. For example, in the embodiment of FIG. 5, in the case where the two monomedia JPEG 104 and WAV 105 are selected at time t4, if the flag descriptorParam is set to standalone in each of them, it is impossible to execute them at the same time, and therefore, one of them is selected and executed.

If it is determined at step S6 that there is only one monomedium in which the flag descriptorParam is standalone, that means that there is no other monomedium in which the flag descriptorParam is standalone, and therefore it is not necessary to prohibit its execution. Thus, the monomedia selected at step S2 are executed at step S8.

Similarly, if it is determined at step S3 that the monomedia selected do not include any monomedium in which the flag descriptorParam is standalone, it is not necessary to prohibit its execution. Accordingly, in this case, the processes of steps S4 to S7 are skipped, and the monomedia selected at step S2 are executed at step S8.

After the execution process at step S8, control returns to step S1, and if there are next monomedia, the monomedia are selected, and similar processes are repeated. If it is determined at step S1 that there is no next monomedium, this procedure is finished.

Next, with reference to the flowchart of FIG. 8, a process of controlling the scripts NCL Scripts will now be described below.

At step S41, the determination section 81 determines whether or not there are next scripts NCL Scripts among the scripts NCL Scripts that should be processed sequentially along the time axis. If there are the next scripts NCL Scripts, the selection section 82 selects the next scripts NCL Scripts at step S42.

Next, at step S43, the determination section 81 determines whether or not the scripts NCL Scripts selected include a script NCL Script in which the flag descriptorParam is standalone. If the scripts NCL Scripts selected include a script NCL Script in which the flag descriptorParam is standalone, the determination section 81 determines at step S44 whether or not there is any script NCL Script that is already being executed and in which the flag descriptorParam is standalone.

If there is any script NCL Script that is already being executed and in which the flag descriptorParam is standalone, the control section 85 suspends the script NCL Script in which the flag descriptorParam is standalone, at step S45. For example, the script NCL Script is put into a queue. In other words, the execution thereof is prohibited until completion of the processing of the processing unit that is already being executed. Thereafter, control returns to step S41, and next scripts NCL Scripts are selected, and similar processes are performed.

For example, as illustrated in FIG. 6, in the case where at step S42 the script NCL Script 135, in which the flag descriptorParam is standalone, is selected at time t15, if the flag descriptorParam is standalone in the script NCL Script 134, which is already being executed, a determination of YES is made at step S44, and the suspending process is performed at step S45. In other words, simultaneous execution of the script NCL Script 135 and the script NCL Script 134 is prohibited in essence. This contributes to achieving secure control of the operation of the television receiver 1.

The script NCL Script suspended will be selected as appropriate at step S42, as a next script NCL Script. That is, after completion of the processing of the script NCL Script that was already being executed and in which the flag descriptorParam is standalone, it is determined at step S44 that there is no script NCL Script that is already being executed and in which the flag descriptorParam is standalone. As a result, processes of step S46 and later will be performed.

If it is determined at step S44 that there is no script NCL Script that is already being executed and in which the flag descriptorParam is standalone, the determination section 81 determines at step S46 whether or not the scripts NCL Scripts selected include a plurality of scripts NCL Scripts in which the flag descriptorParam is standalone. If there are a plurality of scripts NCL Scripts in which the flag descriptorParam is standalone, the selection section 82 selects one of the scripts NCL Scripts in which the flag descriptorParam is standalone, at step S47. Then, the script NCL Script selected is executed by the execution section 82 at step S48. In other words, in the case where the flag descriptorParam is standalone in each of the plurality of scripts NCL Scripts selected at step S42, one of them is selected at step S47 and executed, in order to prohibit simultaneous execution of all of them.

If it is determined at step S46 that there is only one script NCL Script in which the flag descriptorParam is standalone, that means that there is no other script NCL Script in which the flag descriptorParam is standalone, and therefore it is not necessary to prohibit its execution. Thus, the scripts NCL Scripts selected at step S42 are executed at step S48. For example, in the embodiment of FIG. 6, in the case where at step S42 the script NCL Script 135, in which the flag descriptorParam is standalone, is selected at time t15, if the flag descriptorParam is not standalone in the script NCL Script 134, which is already being executed, it is not necessary to prohibit the execution of the script NCL Script 135. Accordingly, the script NCL Script 135 is executed at step S48.

Similarly, if it is determined at step S43 that there is no script NCL Script in which the flag descriptorParam is standalone, it is not necessary to prohibit its execution. Accordingly, the scripts NCL Scripts selected at step S42 are executed at step S48.

After the execution process at step S48, control returns to step S41, and if there are next scripts NCL Scripts, these scripts NCL Scripts are selected, and similar processes are repeated. If it is determined at step S41 that there is no next script NCL Script, this procedure is finished.

While the foregoing description refers to the case where the present invention is applied to the NCL, the present invention is also applicable to cases where other languages are used.

The above-described series of processes may be implemented either in hardware or in software. In the case where the series of processes is implemented in software, a program that forms the software is installed via a program storage medium into a computer having a dedicated hardware configuration, a general-purpose personal computer that, when various programs are installed thereon, becomes capable of performing various functions, or the like.

Note that, in the present specification, steps that describe the program stored in the program storage medium may naturally be performed chronologically in the order described herein, but that they may not necessarily be performed chronologically. Some of them may be performed in parallel or independently of one another.

The term "communication" naturally encompasses wireless communication and wired communication, and also encompasses a mixture of the wireless communication and the wired communication, in which the wireless communication is performed in one section while the wired communication is performed in another section. Further, while communication from one device to another device is performed via the wired communication, communication from the latter device to the former device may be performed via the wireless communication.

Note that embodiments of the present invention are not limited to the above-described embodiments, and that various modifications are possible without departing from the scope of the present invention.

The invention claimed is:

1. A data broadcast processing device that receives and processes a data broadcast, the data broadcast processing device comprising:
   means for determining whether or not each of processing units that are to be processed sequentially along a time axis is prohibited from being executed simultaneously with another processing unit;
   means for executing the processing unit if the processing unit is not prohibited from being executed simultaneously with the other processing unit; and
   means for prohibiting execution of the processing unit if the processing unit is prohibited from being executed simultaneously with the other processing unit,
   wherein the processing unit and the other processing unit are each either one of a monomedia and a script, wherein the processing unit and the other processing unit are associated with respective standalone flags, and wherein simultaneous execution of the processing unit and the other processing unit is prohibited only when both the standalone flag of the processing unit and the standalone flag of the other processing unit are set,
   wherein when the processing unit and the other processing unit are both monomedia, simultaneous execution of the processing unit and the other processing unit is prohibited by deleting one of the processing unit and the other processing unit, and when the processing unit and the other processing unit are both scripts, simultaneous execution of the processing unit and the other processing unit is prohibited by placing one of the processing unit and the other processing unit in a queue.

2. The data broadcast processing device according to claim 1, further comprising means for selecting the processing unit, wherein
   said means for determining determines whether or not the processing unit selected by said means for selecting is prohibited from being executed simultaneously with the other processing unit.

3. The data broadcast processing device according to claim 1, further comprising means for, when there are a plurality of processing units that are prohibited from being executed simultaneously with the other processing unit, selecting one of the processing units as a processing unit to be executed.

4. The data broadcast processing device according to claim 1, wherein the processing unit is one of a video image, a still image, an audio, text, and a processing unit for controlling a function of the data broadcast processing device.

5. The data broadcast processing device according to claim 4, wherein, in the case where the processing unit is for controlling the function of the data broadcast processing device, said prohibition means for prohibiting prohibits execution of the processing unit until completion of processing of a processing unit that is already being executed.

6. The data broadcast processing device according to claim 1, wherein the processing unit is a processing unit described in an NCL.

7. The data broadcast processing device according to claim 1, wherein the processing unit is a procedural object described by an NCL script that has been transmitted from a broadcasting device in accordance with the ISDB-T standard.

8. A data broadcast processing method for receiving and processing a data broadcast, the data broadcast processing method comprising:
   determining whether or not each of processing units that are to be processed sequentially along a time axis is prohibited from being executed simultaneously with another processing unit;

executing the processing unit if the processing unit is not prohibited from being executed simultaneously with the other processing unit; and prohibiting execution of the processing unit if the processing unit is prohibited from being executed simultaneously with the other processing unit, wherein the processing unit and the other processing unit are each either one of a monomedia and a script, wherein the processing unit and the other processing unit are associated with respective standalone flags, and wherein simultaneous execution of the processing unit and the other processing unit is prohibited only when both the standalone flag of the processing unit and the standalone flag of the other processing unit are set, wherein when the processing unit and the other processing unit are both monomedia, simultaneous execution of the processing unit and the other processing unit is prohibited by deleting one of the processing unit and the other processing unit, and when the processing unit and the other processing unit are both scripts, simultaneous execution of the processing unit and the other processing unit is prohibited by placing one of the processing unit and the other processing unit in a queue.

9. A non-transitory computer-readable medium having stored thereon a computer-readable program for receiving and processing a data broadcast, the program causing a computer to execute a process comprising:

determining whether or not each of processing units that are to be processed sequentially along a time axis is prohibited from being executed simultaneously with another processing unit;

executing the processing unit if the processing unit is not prohibited from being executed simultaneously with the other processing unit; and prohibiting execution of the processing unit if the processing unit is prohibited from being executed simultaneously with the other processing unit, wherein the processing unit and the other processing unit are each either one of a monomedia and a script, wherein the processing unit and the other processing unit are associated with respective standalone flags, and wherein simultaneous execution of the processing unit and the other processing unit is prohibited only when both the standalone flag of the processing unit and the standalone flag of the other processing unit are set, wherein when the processing unit and the other processing unit are both monomedia, simultaneous execution of the processing unit and the other processing unit is prohibited by deleting one of the processing unit and the other processing unit, and when the processing unit and the other processing unit are both scripts, simultaneous execution of the processing unit and the other processing unit is prohibited by placing one of the processing unit and the other processing unit in a queue.

10. A data broadcast processing device that receives and processes a data broadcast that has been transmitted from a broadcasting device in accordance with the ISDB-T standard, the data broadcast processing device comprising:

means for determining whether or not a procedural object that has been sent via the data broadcast and is composed of a program that is described by an NCL script is prohibited from being executed simultaneously with another procedural object;

means for executing the procedural object if the procedural object is not prohibited from being executed simultaneously with the other procedural object; and means for prohibiting execution of the procedural object if the procedural object is prohibited from being executed simultaneously with the other procedural object, wherein the procedural object and the other procedural object are each either one of a monomedia and a script, wherein the procedural object and the other procedural object are associated with respective standalone flags, and wherein simultaneous execution of the procedural object and the other procedural object is prohibited only when both the standalone flag of the procedural object and the standalone flag of the other procedural object are set, wherein when the procedural object and the other procedural object are both monomedia, simultaneous execution of the procedural object and the other procedural object is prohibited by deleting one of the procedural object and the other procedural object, and when the procedural object and the other procedural object are both scripts, simultaneous execution of the procedural object and the other procedural object is prohibited by placing one of the procedural object and the other procedural object in a queue.

11. The data broadcast processing device according to claim 10, further comprising means for, when there are a plurality of procedural objects that are prohibited from being executed simultaneously with the other procedural object, selecting one of the procedural objects as a procedural object to be executed.

12. A data broadcast processing method for receiving and processing a data broadcast that has been transmitted from a broadcasting device in accordance with the ISDB-T standard, the data broadcast processing method comprising:

determining whether or not a procedural object that has been sent via the data broadcast and is composed of a program that is described by an NCL script is prohibited from being executed simultaneously with another procedural object;

executing the procedural object if the procedural object is not prohibited from being executed simultaneously with the other procedural object; and prohibiting execution of the procedural object if the procedural object is prohibited from being executed simultaneously with the other procedural object, wherein the procedural object and the other procedural object are each either one of a monomedia and a script, wherein the procedural object and the other procedural object are associated with respective standalone flags, and wherein simultaneous execution of the procedural object and the other procedural object is prohibited only when both the standalone flag of the procedural object and the standalone flag of the other procedural object are set, wherein when the procedural object and the other procedural object are both monomedia, simultaneous execution of the procedural object and the other procedural object is prohibited by deleting one of the procedural object and the other procedural object, and when the procedural object and the other procedural object are both scripts, simultaneous execution of the procedural object and the other procedural object is prohibited by placing one of the procedural object and the other procedural object in a queue.

13. A non-transitory computer-readable medium having stored thereon a computer-readable program for receiving and processing a data broadcast that has been transmitted from a broadcasting device in accordance with the ISDB-T standard, the program causing a computer to execute a process comprising:

determining whether or not a procedural object that has been sent via the data broadcast and is composed of a program that is described by an NCL script is prohibited from being executed simultaneously with another procedural object;

executing the procedural object if the procedural object is not prohibited from being executed simultaneously with the other procedural object; and prohibiting execution of the procedural object if the procedural object is prohibited from being executed simultaneously with the other procedural object, wherein the procedural object and the other procedural object are each either one of a monomedia and a script, wherein the procedural object and the other procedural object are associated with respective standalone flags, and wherein simultaneous execution of the procedural object and the other procedural object is prohibited only when both the standalone flag of the procedural object and the standalone flag of the other procedural object are set, wherein when the procedural object and the other procedural object are both monomedia, simultaneous execution of the procedural object and the other procedural object is prohibited by deleting one of the procedural object and the other procedural object, and when the procedural object and the other procedural object are both scripts, simultaneous execution of the procedural object and the other procedural object is prohibited by placing one of the procedural object and the other procedural object in a queue.

\* \* \* \* \*

UNITED STATES PATENT AND TRADEMARK OFFICE
CERTIFICATE OF CORRECTION

PATENT NO.       : 8,875,182 B2  
APPLICATION NO.  : 12/311619  
DATED            : October 28, 2014  
INVENTOR(S)      : Yoshiharu Dewa Page 1 of 1

It is certified that error appears in the above-identified patent and that said Letters Patent is hereby corrected as shown below:

Title page insert item (30), Foreign Priority --JAPAN P2006-275235 10/6/2006--.

Signed and Sealed this  
Third Day of February, 2015

Michelle K. Lee  
*Deputy Director of the United States Patent and Trademark Office*